United States Patent
Logan et al.

(10) Patent No.: US 9,355,418 B2
(45) Date of Patent: May 31, 2016

(54) ALERTING SERVERS USING VIBRATIONAL SIGNALS (71) Applicant: Twin Harbor Labs, LLC, Plano, TX (US)

(72) Inventors: James D Logan, Candia, NH (US); Blake VanThof, Merrimac, MA (US); Kevin Castonguay, Weare, NH (US); Garrett Richard Malagodi, Hollis, NH (US)

(73) Assignee: Twin Harbor Labs, LLC, Plano, TX (US)

(*) Notice: Subject to any disclaimer, the term of this patent is extended or adjusted under 35 U.S.C. 154(b) by 27 days.

(21) Appl. No.: 14/561,919

(22) Filed: Dec. 5, 2014

(65) Prior Publication Data
US 2015/0193844 A1 Jul. 9, 2015

Related U.S. Application Data (60) Provisional application No. 61/918,222, filed on Dec. 19, 2013, provisional application No. 62/038,527, filed on Aug. 18, 2014.

(51) Int. Cl.
G06Q 30/06 (2012.01)
G06Q 50/12 (2012.01)
B67D 1/00 (2006.01)
(Continued)

(52) U.S. Cl.
CPC .............. G06Q 30/06 (2013.01); G06Q 50/12 (2013.01); H04W 4/043 (2013.01)

(58) Field of Classification Search
CPC ................. G06Q 30/06; A61N 1/368; B67D 2001/0811; B67D 2210/00089
USPC .......................... 705/15; 600/508; 340/572.1
See application file for complete search history.

(56) References Cited

U.S. PATENT DOCUMENTS

| 4,433,795 A | 2/1984 | Maiefski |
| 5,379,916 A | 1/1995 | Martindale et al. |

(Continued)

FOREIGN PATENT DOCUMENTS

| CN | 2241397 Y | 11/1996 |
| CN | 101777250 B | 1/2012 |

(Continued)

OTHER PUBLICATIONS

Kahn, Jordan, "XTouch turns any surface into touch-enabled controls for iOS apps", 9TO5 MAC, Mar. 27, 2014, as found at http://9to5mac.com/2014/03/27/xtouch-turns-any-surface-into-touch-enabled-controls-for-ios-apps/ on Aug. 7, 2015.

(Continued)

Primary Examiner — Seye Iwarere
(74) Attorney, Agent, or Firm — Richard A. Baker, Jr.

(57) ABSTRACT

Customer-used objects, such as tabletops, dinnerware, and retail racks, are impregnated with an accelerometer, a processor, and a Bluetooth chip. Taping or knocking such an entity by alerts a worker of a requested service. The accelerometer captures vibration data associated with the tapping or knocking and sends that data to the processor. The processor recognizes the gesture's vibrations. Finally, a recognized gesture will command the Bluetooth chip to send an alert to the server. The invention prevents a customer from second-guessing possible orders or purchases and allows an employee to become more efficient, thus saving time money.

7 Claims, 8 Drawing Sheets (51) Int. Cl.
*G08C 17/02* (2006.01)
*H04W 4/04* (2009.01)

(56) References Cited

U.S. PATENT DOCUMENTS

| | | | |
|---|---|---|---|
| 5,957,776 A | 9/1999 | Hoehne | |
| 6,504,481 B2* | 1/2003 | Teller | B67D 1/1405 222/23 |
| 6,580,360 B1 | 6/2003 | McKee et al. | |
| 6,782,974 B2 | 8/2004 | Leifer | |
| 7,353,136 B2* | 4/2008 | Vock | A43B 3/0005 702/173 |
| 7,927,170 B2 | 4/2011 | Bickerton | |
| 8,196,891 B2 | 6/2012 | Ryaboy | |
| 8,477,463 B2 | 7/2013 | Ajith | |
| 8,608,026 B1 | 12/2013 | Temko et al. | |
| 8,723,699 B2 | 5/2014 | Ivanov et al. | |
| 8,908,478 B2 | 12/2014 | Heeringa | |
| 8,996,767 B2 | 3/2015 | Eaton | |
| 2001/0034151 A1* | 10/2001 | Carr | G06F 21/10 439/289 |
| 2004/0004600 A1 | 1/2004 | Yoneno | |
| 2006/0097983 A1 | 5/2006 | Haggman | |
| 2006/0192763 A1 | 8/2006 | Ziemkowski | |
| 2007/0106172 A1* | 5/2007 | Abreu | A61B 5/0002 600/549 |
| 2008/0136679 A1 | 6/2008 | Newman et al. | |
| 2009/0315704 A1* | 12/2009 | Rosing | G06Q 10/08 340/539.13 |
| 2010/0000980 A1* | 1/2010 | Popescu | A47J 36/20 219/201 |
| 2010/0019922 A1 | 1/2010 | Van Loenen | |
| 2010/0123666 A1* | 5/2010 | Wickholm | H04M 1/0283 345/173 |
| 2010/0315337 A1 | 12/2010 | Ferren | |
| 2011/0016971 A1* | 1/2011 | Yulkowski | E05F 15/20 73/493 |
| 2011/0096036 A1 | 4/2011 | McIntosh | |
| 2012/0306632 A1 | 12/2012 | Fleizach | |
| 2013/0057489 A1 | 3/2013 | Morton | |
| 2014/0001204 A1* | 1/2014 | Temko | B67D 3/0051 222/41 |
| 2014/0095103 A1* | 4/2014 | Temko | B67D 3/0051 702/128 |
| 2014/0194163 A1 | 7/2014 | Tsudik | |
| 2014/0195987 A1 | 7/2014 | Tsudik | |
| 2014/0253483 A1 | 9/2014 | Kupersztoch | |
| 2014/0260642 A1 | 9/2014 | Goel et al. | |
| 2014/0327526 A1 | 11/2014 | Bess et al. | |
| 2014/0327655 A1 | 11/2014 | Avrahami | |
| 2015/0035748 A1 | 2/2015 | Yoon | |
| 2015/0242036 A1 | 8/2015 | Heidari et al. | |

FOREIGN PATENT DOCUMENTS

| | | |
|---|---|---|
| CN | 104075177 A | 10/2014 |
| EP | 2744070 A1 | 8/2006 |
| KR | 101289061 B1 | 7/2013 |
| WO | 2006070044 A1 | 7/2006 |
| WO | WO2010005646 A | 1/2010 |
| WO | 2012045036 A2 | 4/2012 |
| WO | 2012095837 A1 | 7/2012 |
| WO | 2012155997 A1 | 11/2012 |

OTHER PUBLICATIONS

Grubb, Ben, "Keyboard app gives off good vibrations", Stuff.co.nz, Nov. 14, 2012, as found at http://www.stuff.co.nz/technology/gadgets/7943903/Keyboard-app-gives-off-good-vibrations on Aug. 7, 2015.

Spice, Brian, "Carnegie Mellon Student Uses Skin as Input for Smart Phones and Other Mobile Devices", Apr. 6, 2010, as found at http://www.cmu.edu/news/archive/2010/April/april6_skinput.shtml on Aug. 11, 2015.

\* cited by examiner

ALERTING SERVERS USING VIBRATIONAL SIGNALS

1 CROSS-REFERENCE TO RELATED APPLICATIONS

This application claims priority under 35 U.S.C. §119(e) to Provisional U.S. Patent Application Ser. Nos. 61/918,222, filed 19 Dec. 2013, and 62/038,527, filed 18 Aug. 2014. The entire disclosure of each aforementioned patent application is incorporated herein by reference in its entirety and for all purposes.

2 NOTICE OF COPYRIGHT

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

2.1 THE RELATED ART

The efficiency of the average service industry employee can be improved. The common practice in many service businesses is for a person to walk all over the establishment to gather information about the state and needs of their customers. Generally, the employee has very little guidance to find out if something needs to be done and relies on their senses to gather information. This information not only pertains to assisting new and existing customers but to other responsibilities, such as restocking, cleaning, or helping a fellow employee in an area where they can no longer see their guests. When the employee is otherwise occupied and without knowledge of patrons current service needs a problem arises. This problem may lower the quality of service and reduce the production rate for the establishment. Additionally, it is often inconvenient when the employee comes over when the patron is preoccupied. In a restaurant, for example, the patron may have a mouth full of food while the server interrupts and asks if they need anything. Even though the patron may want a service they are not obliged to ask for that service because they are preoccupied.

Employees are humans and make errors in judgments. For instance, an employee may think that his or her guests or customers are doing well; so the employees will begin a small project, such as cleaning up in the kitchen, folding linens, polishing silverware, restocking shelves, or the like depending on the line of work. The patron in need of service will not know where to find help, or they may ask the wrong employee for help. If at a restaurant a drink is empty, or close to empty, and went unnoticed during the initial check, that patron can become irritated and stop patronizing the establishment. At a retail store a customer could be in need of help deciding on an appliance purchase, but if they mistakenly ask an employee who works in the clothing department the customer will be disappointed and frustrated.

There have been attempts to solve these problems. One example is the "iGlassware" system made by Mitsubishi Electronics (Cambridge, Mass.). The iGlassware is a dishwasher-safe beer glass that uses capacitance to measure the amount of liquid inside the glass. Radio-Frequency Identification ("RFID") tags are employed to send signals between the glass and the table on which the glass is located. Then the table sends a signal to either an outside display, or to a hand-held device which the server carries, letting them know that another drink may be needed.

Other teachings of the prior art include the following.

U.S. Pat. No. 6,782,974 describes a keypad at the table and a hand-held device assigned to a specific server. Requests can be made wirelessly to the server via predetermined or dynamically determined options.

U.S. Pat. No. 6,580,360 describes a table for a restaurant consisting of a patron counter, a staff presences detector, and a transmitter. The table is able to determine how many people are sitting at the table and when the server has visited the table. This information is transferred to a remotely located data processing system.

WO2010/005646 describes the use of an accelerometer to detect angle (tilt) of a container, a fluid property processor, with at least on fluidic property value of a fluid, a flow rate processor, and a volume processor. This container is meant to delete the measuring cup stage of measuring liquids for use in a different container by measuring the amount of liquid that comes out of the container by using the tilt of the container and the fluid properties of the fluid that it contains.

WO2010005646 also uses the tilt characteristic to measure how much fluid is coming out of the container, it is meant to rid the world of the measuring cup, not make restaurants more efficient.

Thus, there remains a need to provide means for better, more efficient service of customer needs. The present invention meets these and other needs.

3 SUMMARY OF EMBODIMENTS OF THE INVENTION

The present invention comprises apparatus and methods for improving communication between servers and customers, and, more particularly, between servers and diners. Examples of apparatus provided by the present invention include flatware, silverware, glassware, walls, surfaces, and the like impregnated with an accelerometer, processor, and a Bluetooth chip (e.g., for OEM design). The invention include devices and methods for retrofitting existing apparatus. For example, a removable tab that contains said hardware which can be attached or removed from the object. This retrofit application will allow for the invention to be disposed of once its life cycle has been completed.

The purpose of the device is to wirelessly alert servers when a customer has potential service needs. This alerting system can operate at any time. For example, is the invention used during a meal at a restaurant, the system may operate before the customers begin eating, when they are done with their first course, or done with the entire meal and requesting the check.

One embodiment of how the invention works is as follows: when a device in accordance with the invention is moved, tapped, or activated, it sends a wireless signal that alerts the employee responsible for serving the signaling customer. In some embodiments, certain taps may in some instances designate other servers; for instance, if one person is responsible for refilling all drinks within the restaurant or if a manager is requested. For example, in a restaurant the refill tap would be sent to the refill server, while all other taps would be designated to the waiter at that table. Once the employee reaches the destination of requested service, the alerting device is paired with the invention's Bluetooth chip. If paired for at least five seconds (or other designated), then the system designates that service has been provided, and the device will reset or clear that specific request for service.

Different movements or taps may be specific for certain types of service. Some taps may be exclusive for certain types of service; for instance, one tap on a glass meaning the customer requests a refill and two taps may mean they would like a different drink, or something of the sort. Furthermore, these taps or movements may mean different things in different locations of the restaurant or bar. For example, tapping a glass may just show up that someone is requesting a refill while it is at the table or at a bar. But when the glass is tapped by the cash register it could mean it is pairing that drink to the bill. Additionally, the signals may mean different things dependent on tap location on the glass or plate ware. For example, while at the table the patron could tap the top of the glass; this may mean that the user would like a refill. But if the patron tapped on the bottom of the glass this may mean that the patron would like general service of some other sort. In a retail store, one tap on a shelf may mean the customer needs help finding something and two taps may mean they have a question about a specific product. In some more specific embodiments, the invention is implemented on every isle and alerts employees of the products the customer is looking at; thus giving those employees an opportunity to assist customers ahead of less qualified employees. In another example, on a airline flight one tap of a passenger on their chair's arm rest means the passenger would like a pillow and blanket, and two taps means they would like to order a snack.

In other embodiments, vibrational signals are used. For example, all bars at any pub or restaurant are structurally made from a solid wooden, laminate, or metal material. Tapping, knocking, bumping or just general contact with a bar will generate sound vibrations that travel through the bars solid material at rates faster than the speed of sound through air. Using two accelerometer sensors on a linear plane at opposite ends of the bar, the vibrations can be detected and processed. Determining how many and what type of interactions occurred (tap, knock, bump, swipe, scratch) allow for a wide range of gesture recognition. Determining where the interaction originated in this one dimension example allows for the bartender to know which customer is requesting service.

These and further aspects and advantages of the present invention will become apparent when the following disclosure is read in conjunction with the accompanying drawings.

4 BRIEF DESCRIPTION OF THE DRAWINGS

Exemplary embodiments of the present invention are described herein with reference to the following drawings, in which.

5 DETAILED DESCRIPTION OF SOME EMBODIMENTS OF THE INVENTION

The present invention provides methods, apparatus, devices, and systems for communication between servers and customers that will create a more meaningful and stable environment for both. Using the present invention virtually every trip by a server to render customer assistance will be worth the server's time. In a busy, controlled chaos type of atmosphere, such as a restaurant or retail store, the server can attend to the people and things that need attention when they need it and not waste time by checking if they are served, when in fact they may just think of this interruption as a nuisance. The present invention provides methods, systems, and devices to determine the amount of liquid in a drink or the amount of food on a plate. Furthermore, the invention does not need to incorporate RFID readers in a table to send a signal. The invention also solves the issue of unwarranted visits. Just because the glass is empty doesn't mean the patron wants another drink. The present invention will thus be seen to address the significant limitations of the prior art.

In some embodiments, the present invention uses vibrational signals, also referred to as "taps", which are also described in co-pending U.S. Patent Application Ser. Nos. 62/038,505; 62/075,308; 62/038,516; and 62/038,501. The entire disclosure of each of these patent applications is incorporated herein in its entirety and for all purposes.

5.1 Dishware and Serving Utensils that Communicate with Staff

In a first aspect, the present invention provides devices and apparatus including an accelerometer (such as, but not limited to, Analog Devices ADXL330), a Bluetooth chip (such as, but not limited to, Texas Instruments CC2560), battery (or other energy supplying device), and a processor are utilized in constructing the devices and apparatus. For example, the devices and apparatus of the invention include pieces of flatware utensils and user-ready surfaces. As will be explained in greater detail herein, embedded within the construction of the piece of flatware/surface or used as an add-on to existing flatware/surface, these components work together to send a signal to an outside interface.

Figure 1:
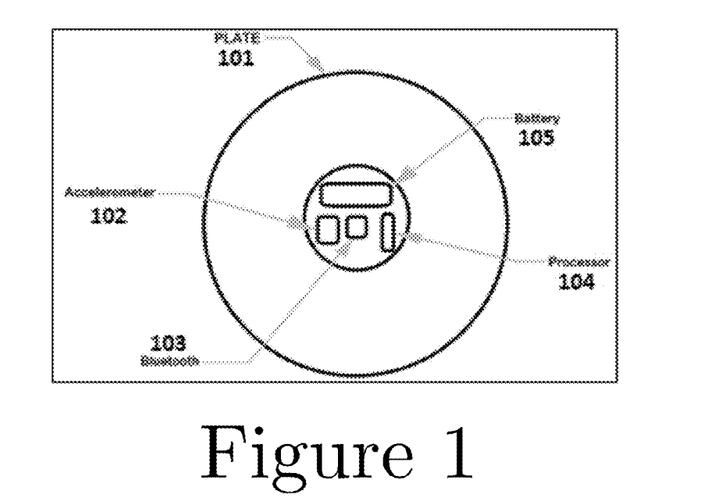
FIG. 1 is example of a plate in one embodiment of the invention.
Figure 2:
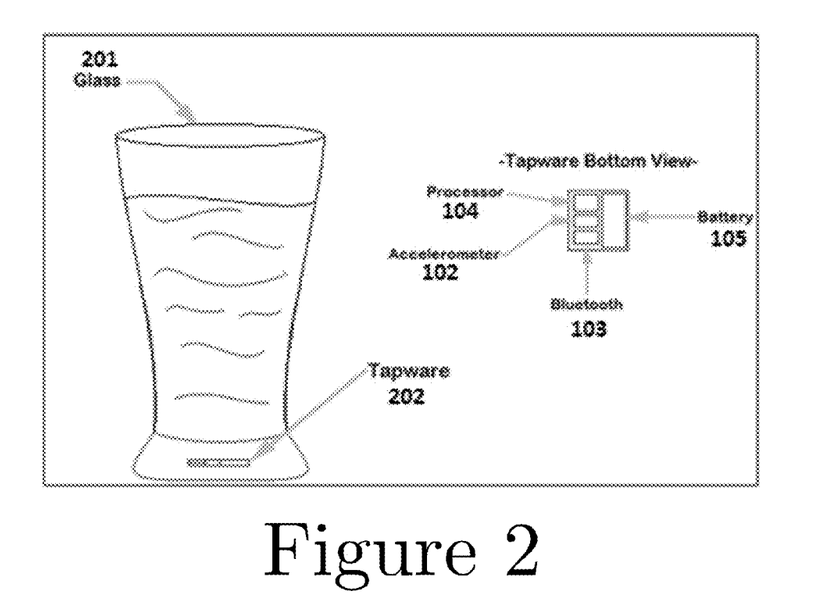
FIG. 2 is an example of a glass in accordance with the present invention.

FIGS. 1 and 2 illustrate examples of the invention being implemented in the forms of a plate (101) and a glass (201) respectively. In both examples the hardware is made up of an accelerometer (102), a Bluetooth chip (103), a processor (104), and a battery (105). Tap signatures are detected by the accelerometer (102) and processed by the processor (104). Processor 104 may detected different tap signatures than the processor shown in FIG. 2. This is because of the way a user will interact with a plate (101) would be different than a glass (201). The chip in the plate (101) is located on the bottom in the middle of the plate (101). The chip in the glass is located on the bottom of the glass and can be seen with a bottom view in FIG. 2. The fabrication of such implements will be familiar to those having ordinary skill in the art.

Restaurants that don't want to purchase all new glass and plates having the novel features just described can retrofit existing dinnerware, according to other embodiments of the invention.

Figure 3:
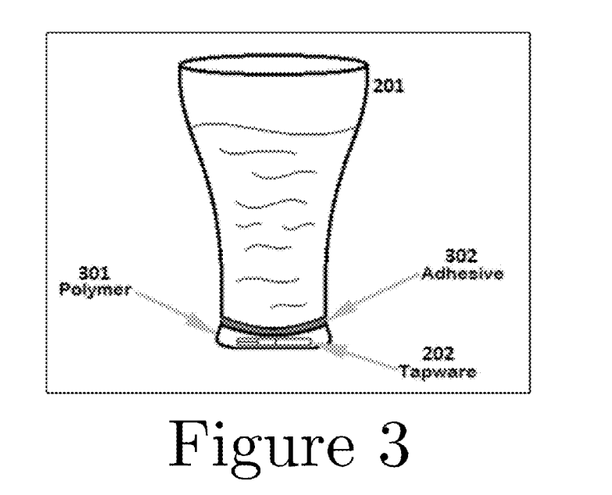
FIG. 3 is a first example showing how a glass can be retrofitted in accordance with the present invention.

FIG. 3 is an example of a flat bottom glass (201) that is retrofitted in accordance with one embodiment of the invention. A polymer body (301) surrounding the the invention (202) electronics can be attached to any existing glass using waterproof and durable adhesive (302). The original glass (201) has no prior wearable access technology and a tap on the original glass will send vibrations to the invention (202) on the bottom. The fabrication of such implements will be familiar to those having ordinary skill in the art.

One example of a way to retrofit a glass in accordance with the invention is to make a coaster that can be placed underneath any glass. These coasters would have the vibration sensing circuitry inside them and would be able to account for the location based tap sensing that some embodiments of the invention could have. The coaster would encase a small portion of the bottom of the glass and would have built in quadrants, like a pie with four slices (See FIG. 6 for visual comprehension). Each quadrant would manipulate the user inputted vibration that would run down the glass differently. One could dampen the vibration sharply, or not so sharply. One could echo the vibration over itself for a measured amount of time. Another could allow the vibration through a single, predetermined space or more than one space. The accelerometer would pick up these vibrations, and transfer the signal the processor for input recognition. In this way, each side of the glass, or curved portion of the glass could have its own "fingerprint" per say. These fingerprints could be programmed to mean different things, and the glass could be printed to tell the patron where to tap the glass for what they could want. For example, the glass could have certain sections outlined by lines on the outside of the glass (like stripes). Each line could have an instruction on it, such as "Call Server", "Refill", "Check", or "Change Drink". This creates a completely content independent environment for the accelerometer to measure vibration. Since we're not worried about the shape of the waveform, but rather how long it vibrates for, it doesn't matter how the liquid in the glass deforms it. Additionally, in some embodiments the coaster has the ability to determine what side of the glass was tapped based upon vibration recognition within the coaster.

Figure 4:
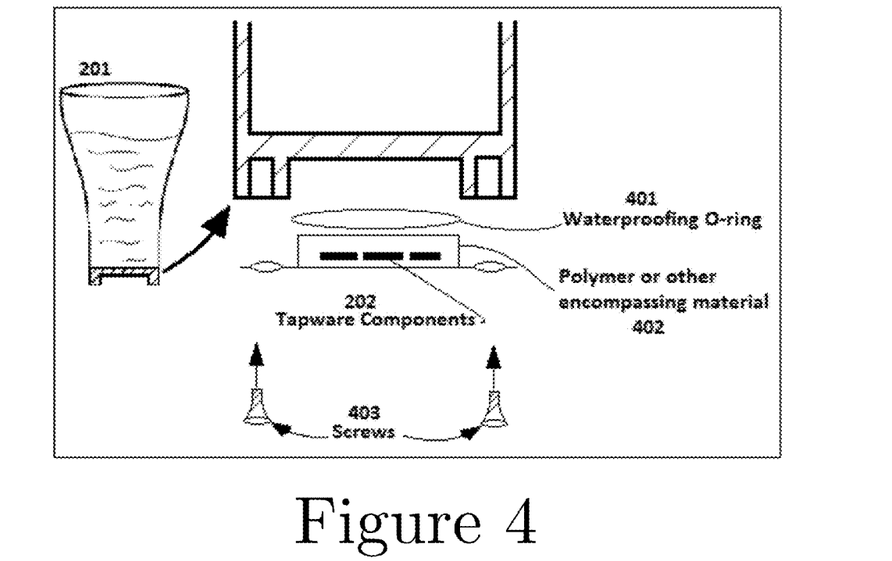
FIG. 4 is a second example showing how a glass can be retrofitted in accordance with the present invention.

FIG. 4 is an example of a the invention glass (201) that has the electronic the invention components (202) directly installed into the glass. This way of instillation will allow for better tap recognition, better protection of the electronic components, and will increase the life of the glass. The screws (403) will hold the invention components (202) in place better and help increase vibration detection. The tighter the polymer (402) fits up against the glass (201) the more accurate the readings will get. The system will also have a waterproofing ring (401) around the invention components (202), keeping them dry. This manufactured the invention glass will also allow for a better feeling and more aesthetically pleasing design.

New restaurant or restaurants wanting a better manufactured the invention product could purchase glasses specifically designed for the invention.

Figure 5:
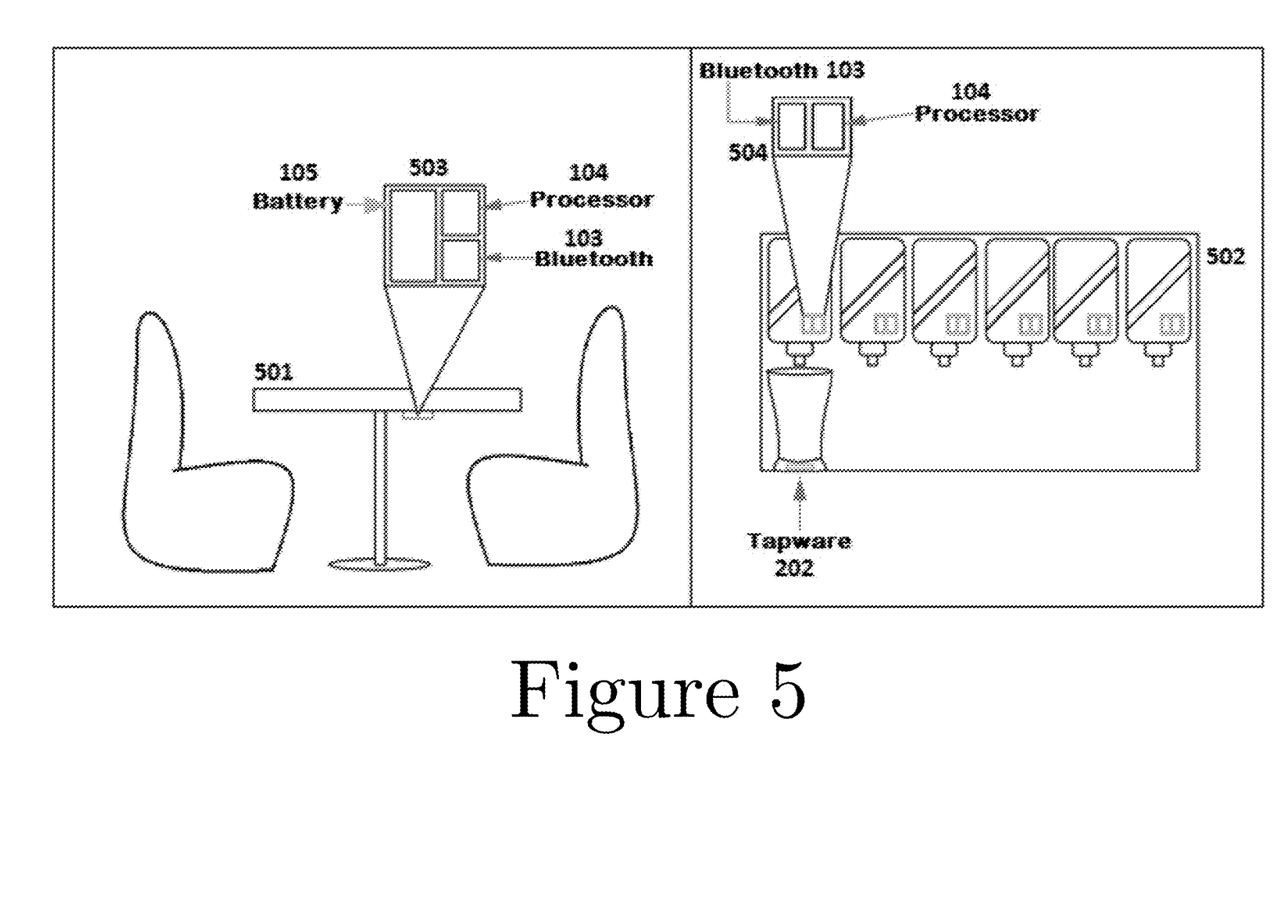
FIG. 5 is an example of remembering what drink was in a glass in accordance with the present invention.

FIG. 5 illustrates a scenario in those embodiments of the invention used in restaurants or other food service settings. A table (501) includes a sensor (503) having Bluetooth device (103), processor (104), and batter (105) as described herein. A soda dispenser (502), having a sensor (504) including a Bluetooth device (103) and a processor (104) as shown, senses that a glass is getting filled with a specific soda and "pairs" with chip (202) in the glass that is being filled. While the cup is being filled, the processor (104) in the soda dispenser sends a signal through Bluetooth (103) to the Bluetooth (103) and processor (104) of the invention glass (202) that is being filled. The signal informs glass (202) of what type of soda is being dispensed. The invention glass (202) now has on record what drink the patron has even when the glass is empty. When the patron signal for another drink, either by taping the glass or placing over a sensor on the table (501), the server can bring a filled drink to the patron without making the initial trip asking what drink they had. If the patron wants another drink, they could place their the invention glass (202) over a sensor (503) located in or under the table (501). The sensor (503) could determine through Bluetooth (103) or some other proximity sensing, that a glass has been placed on it, thus requesting a drink.

Thus, in one exemplary embodiment of the invention a soda machine sends a signal to a glass outfitted in accordance with the invention to store data about what was in the glass. The glass transfers the signal to the table upon arrival, which would make it able to send the data to the waiter when the patron signals for another drink. The table would send a signal that the patron would like a refill of iced tea for example. So, the server would pull out a the invention glass from the dish rack, as the glass was brought close to the soda fountain, it would pair with the tap that it was closest to. In one non-limiting example, it pairs with iced tea, and the server fills the glass with iced tea. Now the glass knows what it holds, and is being carried to a table. When it reaches the table, the data is transferred to the table. If the table is keeping track of the check then the table would add one sprite to the tab. Now, the table knows where the glass is, and what's in it. The patron consumes the drink (e.g., iced tea) and taps the glass for a refill. The tapping initiates a signal that is sent to the table; the table then sends the information to the alerting device. The alerting device sends a message to the server. The table number and the contents of the glass can be displayed to the server in any number of manners (visual display, hand-held, etc.), e.g., "iced tea refill table 3"; and the server grabs a glass and goes to the fountain. The fountain pares with the glass and tells the glass iced tea is the glasses contents. The glass of iced tea goes to table 3 and pairs with the table adding one more iced tea to the tab and designating that the glass is at table 3.

5.2 Methods for Enabling Communication with Staff

Figure 6:
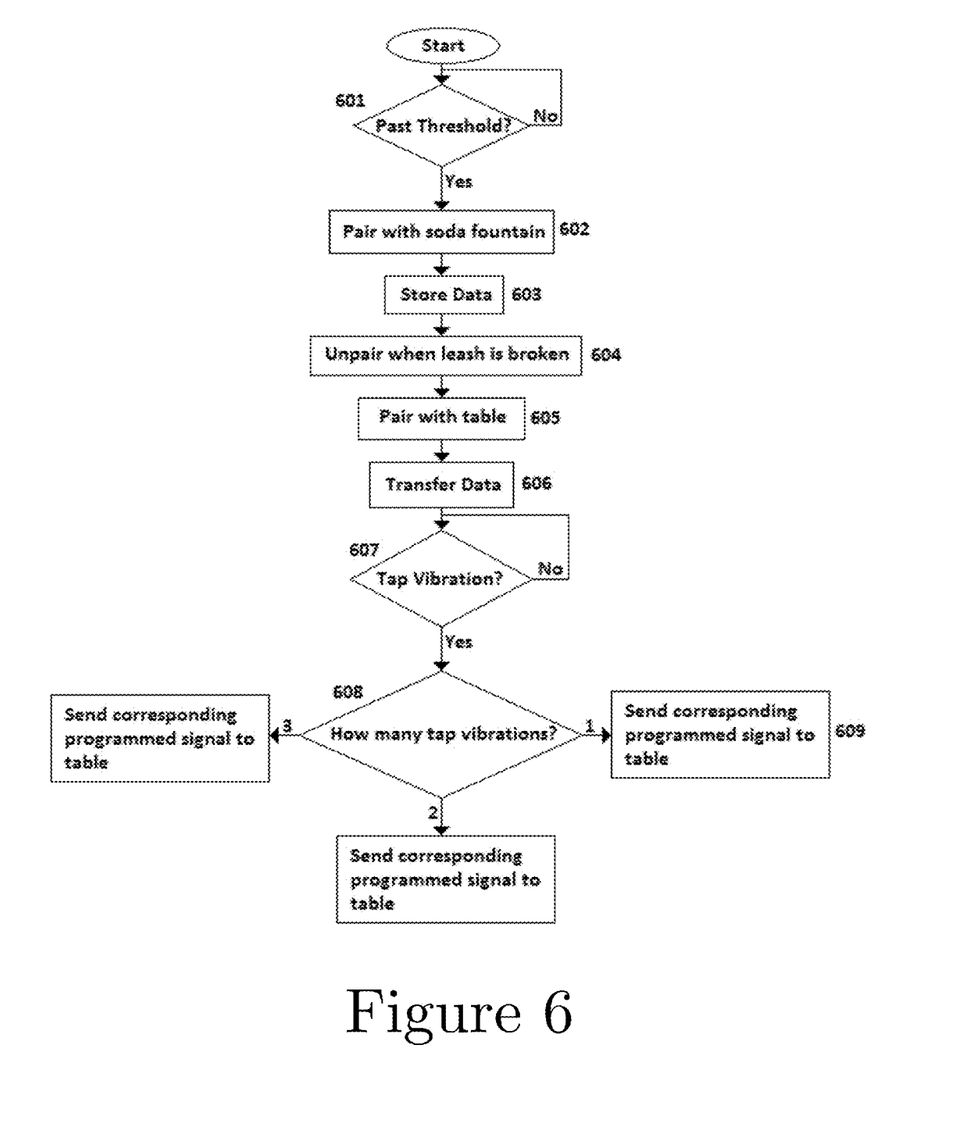
FIG. 6 is a flowchart depicting the process of knowing what drink was in the glass in accordance with the present invention.

FIG. 6 is a flowchart depicting one example of a process of knowing what drink is in a glass along, with tap recognition, in accordance with the present invention. The first time a glass is filled up the empty glass containing no data checks if the glass is through a "threshold" (601). This could be a door way or when placing the glass on the fountain. If no, the glass prepares to check again on the next clock cycle. If yes, the glass pairs with the soda fountain (602) and collects data on what drink is being poured (603). When the leash between the glass and the soda fountain is broken, the two unpair (604). When the glass is within range, it pairs with the table (605) and transfers the drink type data to the table (606). The glass then acts as any the invention device described above and listens for tap vibrations (607). If a tap vibration occurs, depending on the number and signature of the taps, a command is called. These commands are pre-programmed signals sent to the waiter in order to request serves, like a refill or the check.

In some embodiments, the table stores the tab to simplify things for the server.

In some embodiments, the invention glass distinguishes between number of taps, tap types, or both. Some non-limiting examples include one tap for "more of the same", two taps for "I want something else" three taps for "I'm none and would like the check". The glasses could be programmed to recognize any number of tap sequences, but eventually it may become over complicated and unnecessary.

Figure 7:
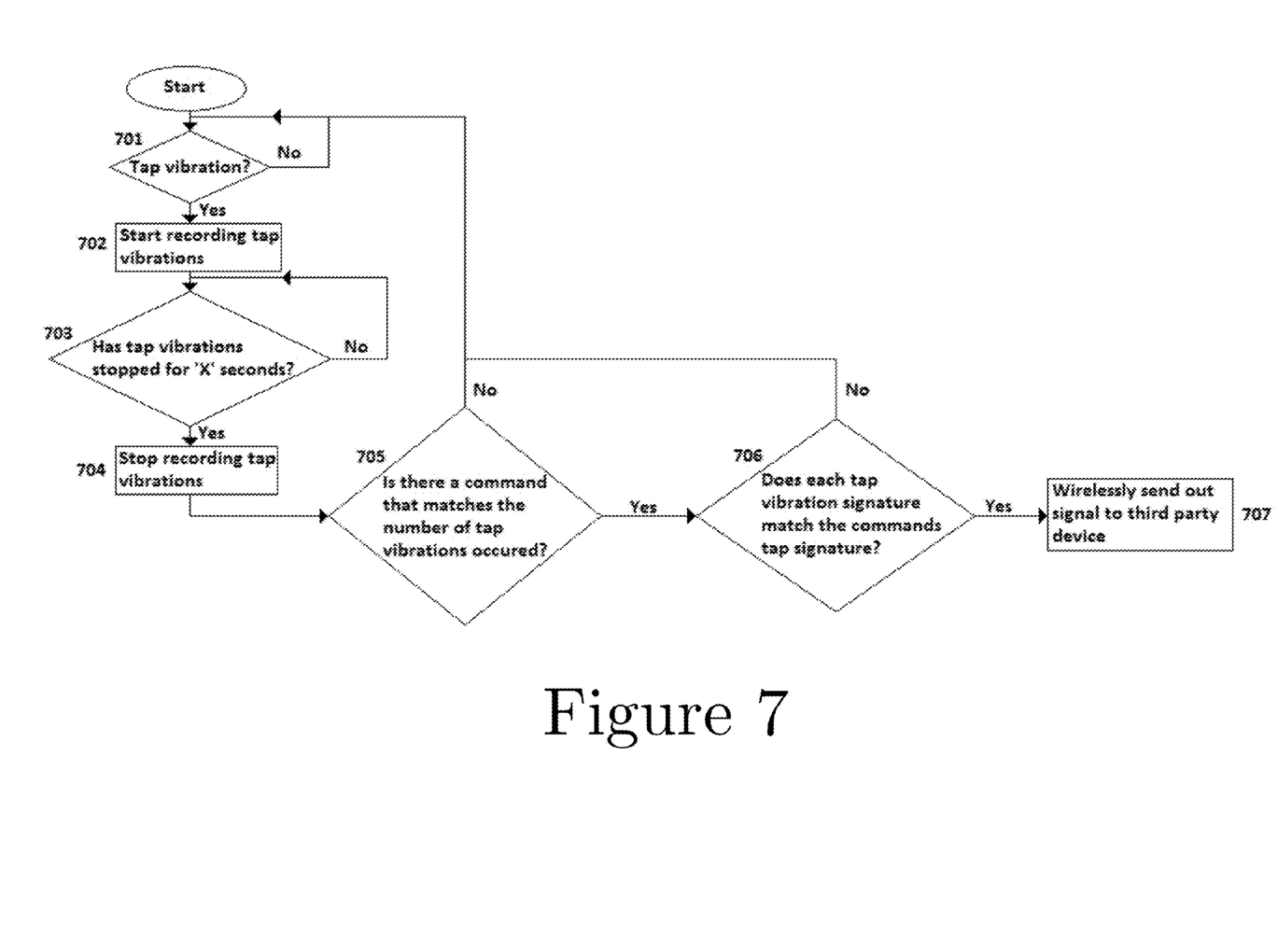
FIG. 7 is a flowchart depicting the process of detecting user tap vibrations and signaling a command in accordance with the present invention.

FIG. 7 is a flowchart depicting the process of detecting user tap vibrations and signaling a command. The process begins by listening for a tap vibration. Every clock cycle the program asks if a tap vibration has occurred (701). If no tap vibration has happened in order to signal the rest of the process to proceed, the answer is no and the program prepares to ask again. This is a loop the program will spend most of its time in. Most will spend most of their time stationary. If the hardware detects a vibration the processor starts recording the vibrations (702). The processor will continue recording until the accelerometer has not detected vibrations in 'X' amount of seconds (703). 'X' would be somewhere between one to two seconds. Then the processor stops recording (704). Many times the command will require multiple taps to occur. The next step is for the processor to determine if the number of taps that has just been recorded matches the number of taps required by one of the command options (705). If no, the tap(s) must have been accidental and the process resets to detected vibrations (701). If yes, the process searches its data base to attempt to match the recorded signatures to a commands signature (706). If there is no match the process starts over to detecting vibrations (701). If there is a match the processor sends out a wireless signal from the integrated Bluetooth to a third party device requesting service (707).

5.3 Determining Patron Status

When a plate reaches its table, the plate will pair with the table, storing information about what table it is now. The plate or other tableware will relay tap information to the table hardware in/on the table and then this information can be relayed back to the server for that table (See FIG. 5). The information is relayed to the server either by a display in the kitchen, a hand-held device carried by the server, e.g., using a smartphone or smartwatch.

In some embodiments, the devices of the invention relay information from the patron to the server. For example a glass, embedded with a processor, Bluetooth chip, accelerometer, and battery could recognize tap signatures (tap signatures are vibrations created by a person taping an elastic medium. For example, two taps will send two detectable vibrations through a material like glass). With these tap signatures the glass could send a signal through Bluetooth directly to the server. Two taps may indicate a request for a refill of their drink, while three taps may indicate a request for the check.

In some embodiments, when a signal is sent for service at a table the server will be notified, by way, e.g., of a light-emitting display ("LED"), or other more advanced display techniques such as a smartphone or smartwatch type device. As the server walks up to the table and gets within the proximity of said table (possibly staying there for more than, e.g., about four seconds), the notification device pairs with the table then the table sends a signal to an already paired device. From there the signal is turned off and reset. This is done by way of the proximity detection available in a Bluetooth chip.

In other embodiments, with the accelerometer embedded into the plate it can be accurately determined when someone has stopped eating, if a plate picks up a large amount of activity from a fork, spoon, or other utensils then activity begins to slow, eventually stopping. If this activity stops for a specific amount of time, e.g., such as about five minutes or some other predetermined amount of time that seems adequate then the plate would send a signal to the table unit which then could alert the waiter that the customer may be done eating.

In still other embodiments, a signal is sent if no tap is received after a set time. For example, in some embodiments of the invention, the intervals between taps for a patron is monitored. If no tap is detected for a determined time, then a staff member is alerted to check on the patron. In other embodiments, the time from the last interaction between a staff member and a patron is monitored. If no tap signal is received after a determined period, then a staff member is alerted to check on the patron.

5.4 Assignment of Duties Using the Invention

Another practical use for this proximity pairing is assigning tables to servers; this could be done in multiple ways. One way this could be accomplished: the proximity sensor could recognize the server and then ask the server if they are trying to pair with this table. The server may then press a button on their smartwatch or other form of electronic alerting device to complete the pairing process to confirm (they could possibly perform some other action to confirm pairing as well). Pairing may also be assigned manually by management. The manager may simply pair all tables that are within the server's section to the server's signaling device.

With software capable of handling such a task, tables could be efficiently assigned, and managers could keep an eye on server's performance, via a management/performance display, tracking things such as response time and other services of this nature.

In another embodiment, the table could either be retrofitted, or built to have a sensor in the middle of the table so when you put an empty glass there, the server would be signaled for service. Additionally, the type of glassware or flatware that is placed in the sensor could send out a different type of command to the server. For example, the patron finishes their drink, and places the empty glass in the center of the table. The server would be signaled to come over to the table, and the patron could either order another or stay without a drink. If the meal is complete and the patron would like the check, they may put the fork or another piece of flatware on the sensor. This action could call out the server to bring the check. Yet another example would be to place the spoon if the customer would like the dessert menu.

In yet another embodiment, location information provided by the embodiments described herein could be used to determine where in the restaurant a glass, or dish is located, e.g., by Bluetooth LE (available in the same chip as regular Bluetooth (Bluetooth 4.0)). This embodiment eliminates the need for a table to be retrofitted, as its location is already known by this other method.

5.5 Power Management of the Devices of the Invention

In all embodiments of the present invention, a battery is included in the on board circuitry of the invention. This battery could be a regular watch battery or it could be a lithium ion battery if need be. A rechargeable battery is also a possibility, connected to a photovoltaic solar cell or other charging methods like induction charging.

In the case of it being a watch battery, or similar type, the invention could be a rechargeable or a replaceable item when the battery dies. The battery could also be replaceable.

In the case of it being a built in battery, the glasses could be charged by induction, much like the pad they sell for charging cell phones. No one is going to want to have a specific spot that the glasses need to be placed for charging of the battery to occur unless it is convenient. One of the main benefits of the invention is how well it "fits in" with modern dining already. The best way to get the invention recharged, without having to change procedures, is to put the charging pads in the dish racks or on the sink tops so they charged every time they are washed. They could also be placed on the tables or in a coaster like object. The inducting pads could perhaps even charge a patrons phone.

In some embodiments, the devices provided by the present invention have the ability to turn off when not in use. Other embodiments include a power saving mode. Still other embodiments include charging when in the kitchen, in the dishwasher, on drying rack, on storage shelves, or while in other holding or storage areas.

In some embodiments, the devices of the invention are activated or deactivated upon passing through a specific threshold. For example, if the invention goes from the kitchen where the invention is off through a threshold as it leaves the kitchen the invention will attempt to pair with the closest homing device.

5.6 Contextual Awareness of Devices of the Invention

In other embodiments, the devices of the invention operate differently depending on their location, i.e., they have "location awareness". For example, a drinking glass taken to the bar will pair with the bar homing device and operate using bar application tapping commands. If the same glass is later taken to a dining table it would then pair with the dining table homing device. Once paired it responds to tap commands that are specific for that dining area. If the invention didn't have the option to connect to the table or bar, it would connect with the server or bartender closest to it; its tap command application could pair with the server's duties.

In some embodiments, when the table or bar is bussed, the glass will be taken to the kitchen as soon as it passes through the kitchen doors at the location of the on/off threshold the glass will then be deactivated and reset. Once deactivated, it is then cleaned, dried, and stored. It is while the invention is in the drying or storage phase that it will likely be charged. Then when it comes time to use the invention again it would be taken from the storage/charging area, then pass through the kitchen threshold turning on and activating the invention again.

5.7 Charging Customers

Pairing can also be used for charging a customer. In one example, a beer glass behind the bar is paired with someone's card or bar tab. For example, when the customer has finished their drink the bartender may clink the glass that was just finished with the new glass that will be filled and served to the customer. when this glass is "clinked" this action could take the stored data from the old glass and transfers this data to the new glass additionally it adds a drink to their tab. Henceforth, the bartender would not have to access the computer and manually add data to the computer the glass clinking has already added a drink to the tab. Then when the tab needs to be paid the bartender can take the glass with stored data and clink it to a cash register that is designed to work with the invention. From there this action can transfer the data to the register and then the bartender can proceed to cash out the patron, swiping the users' card or be doing so using other means. The same clinking action outside of the bar's perimeter would indicate something different. For example, it could be used to a buy drink for somebody.

In another embodiment, the clinking of two glasses outside the bar means that someone is buying a person a drink, but only after specific callout. For example, the callout or activation method could be the buyer tapping their glass on a table twice activating that glass, giving customer the ability to buy a drink for the first person they clink glasses with. Then clicking it with the glass of the receiver's glass could be the action that passes along the command. Once clinked the receiver can get a refill and the refill will be stored onto the buyers cup and therefore stored onto their bar tab of the buyer not on the tab of the receiver.

In some embodiments, the invention holds information like meal, food, or drink content. This way it can be paired with the cash register or other devices to determine the bill. In certain embodiments this information is stored with a glass. In other embodiments, a master glass is designated at a given table that stores the information. The person paying the bill is assigned the master glass. In some embodiments, the data is transferred to the cash register via a bump.

This concept of bill storage would be especially useful in a bar setting. If someone were ordering it would be useful if the patron's glass stored data about drink history. When the patron would like a refill the bartender could take the empty glass with drink history stored on it, they could then tap the empty glass with a new glass. This tapping transfers this information to the new glass and adds to the bill whatever they are getting as a refill. Along with transferring the information to the glass it seems that I would be nice if the drink history could also be sent via Bluetooth to be electronically stored at the register.

This procedure simplifies the process for the bartender because every time a new drink is poured all they would need to do is bump glasses transferring information via Bluetooth to the new glass and also to the tab at the register. There may be a need for different glasses which could be designated for different priced drinks.

Another embodiment, with or without drink history, may involve simply tapping a glass with a specific gesture or knocking the glass against the table or bar more than once. These simple gestures could request the bartenders attention with simple commands like a refill or "check please".

5.8 Signaling Staff

In all embodiments of the present invention, the server must be notified at some point to come to the table. This can be done in an assortment of different ways. From TV display, to small blinking LEDs, to devices that are carried with the server, like a beeper type device or smartwatch. Each method has its benefits and disadvantages. In some embodiments, the user interface for the server is at least one of an indication on the table, an app on a phone or iPad that the server carries around, or an indication at the server station, or a combination thereof.

The a first example, a monitor placed either in the kitchen, behind the bar, or both, and displays information about all the tables in the restaurant, much like many host stand computers do. When a server goes into the kitchen, or a bartender looks at the screen, they could just look up and see what all their tables are doing. If anyone needs anything the screen could display the table, their needs, and the server this table is designated to. It could show one server, a number of servers', or all servers' tables simultaneously.

A second example works along the same lines as the monitor display, but it is simpler and cheaper: a permanent display of the tables in the restaurant is provided, with a number of colored LEDs that that display the progress of a patron at a restaurant, at their seat number. For example, yellow could be "idle for a bit", blinking red could be "needs attention immediately", an empty seat could be blue, etc.

In another example, the server carries a dedicated device or a smartphone running application they could use. This way, they can be anywhere in the restaurant and receive information about what their tables are doing. Problems could arise where a servers hands are constantly being washed, so they are either wet, or have something else on them, or they're just using them to carry items all around the restaurant. A waterproof wristwatch, with a display of only the server's tables, or that just showed notifications, either by explicitly saying it, or using LED's to show that they need to check on a table or a service has been requested. For example the wristwatch could show table 7 requests refills or table 7 requests check etc. this idea would likely work better than all others it has the ability to get the servers attention immediately anywhere in the restaurant, and can show what the tables needs are, where the table is, etc.

Furthermore, as explained previously, if this watch were used the table that requested service could be attached to the watch and know when it is close to the table. When the table recognizes that the watch has been within a close proximity to the table for the required amount of time (approximately 5 seconds seems adequate) then the service command could automatically reset, assuming the service request has been fulfilled.

The use of this watch could potentially enable a server to take more tables at once due to the fact that it would practically eliminate wasted time to checking on tables that don't need service. Consequently the restaurant would become more efficient and the restaurants could cut labor costs by hiring fewer servers.

To further make the server more efficient, in some embodiments rather than the table just send a signal to the alerting device saying that someone needs service, go help them; the server is notified to what the specific needs of guest are. In turn, eliminating the first trip to the table to find out what it is that they need. For this, the server's device, the table, and the glass would know what was in the glass to begin with.

5.9 Vibrational Communication with Staff Via Devices of the Invention

In some embodiments, patterns of taps are used to communicate customer needs. For example, a "Next" command could be generated by tapping a plate or cup three times with a piece of silverware. Alternatively, a function is connected to the swirling of the liquid in a glass. In other embodiments, shaking glass alerts a server that the customer wants a refill.

Imagine a person is sitting at a bar and they want another drink. The bar is loud and they can't, or don't want to, get the attention of the bartender by shouting and waving. They could "tap" or "knock" on the bar with a broad pattern, intensity, and location. the invention built into the bar would know the relative location and recognize the "type of tap" and relay the information onto the server, similarly to the invention's implementation into glassware. Determining the location of the "tap" would require knowing the speed at which sound travels through the solid material of the bar. Fortunately, the rates for most common solid materials have already been calculated. A calibration process may be necessary in order to get a rate as close to the actual rate as possible. Entering the type of material, no matter how vague, could help in calibrating. For example, the top of a bar is made of one solid piece of oak. In a program designed for a bar touch and location recognition system, a list of woods (and other materials) would be available.

TABLE 1

| Speed of Sound in Various Materials | |
|---|---|
| Material | Speed (fps) |
| Oak | 12,662 |
| Pine | 10,900 |
| Elm | 14,639 |
| Sycamore | 15,314 |
| Ash | 16,677 |
| Maple | 14,472 |
| Aluminum | 21,063 |
| Steel | 19,107 |
| Glass | 13,000 |
| Granite | 19,635 |

For example, selecting "oak" would tell the program the speed at which sound travels through oak should be around 12,000 feet/second based on the predetermined rates. If the material of the bar wasn't known or if the location is still inaccurate the program could instruct the user through a series of taps, knocks, bumps, and other interactions at predetermined distances along the bar. Knowing the distance and time difference between each accelerometer, with enough samples, would allow for an accurate rate of travels through every unique bar material.

Figure 8:
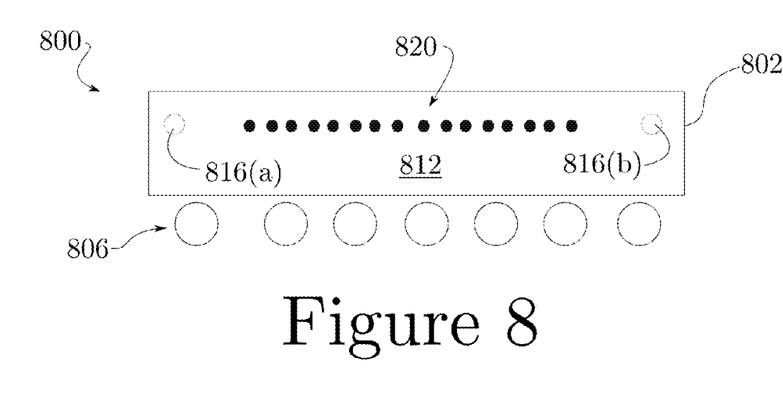
FIG. 8 is an example of the calibration process on a linear touch table in accordance with the present invention.

FIG. 8 illustrates such embodiments and processes at 800. There, a bar or other serving structure (802, hereinafter "bar") having various sitting or consuming locations (806) includes a surface 812 on which serving ware and dinnerware, such as, for example, bowls, platters, glasses, cups, plates, utensils and the like, are placed. Two accelerometers (816(a) and 816(b)) are placed at locations on each end of the bar. In some embodiments, the accelerometers are recessed (indicated by the dashed lines); in other embodiments, the accelerometers are on the bar surface. The invention includes all embodiments in which the accelerometers can detect vibrations as described herein. In some embodiments, as just described above, a series of taps shown generally at 820 are used to calibrate the accelerometers and other elements of the system of the invention.

Figure 9:
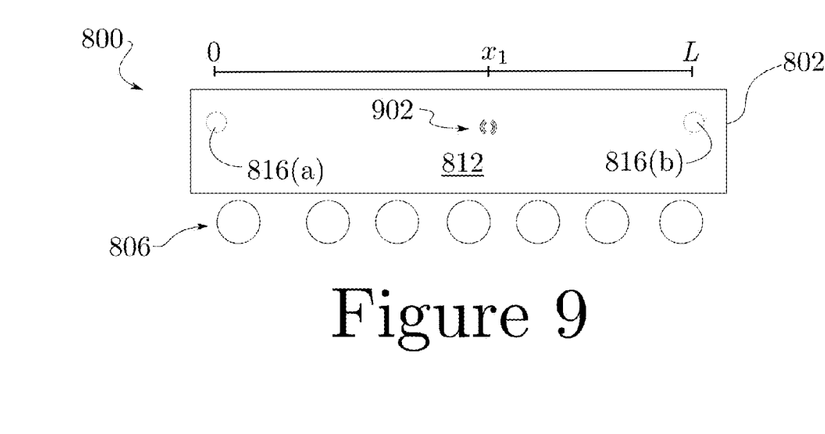
FIG. 9 is an algorithm along with a picture explaining the process of locating the "tap" on a linear table in accordance with the present invention.

FIG. 9 illustrates one example in which the distance from accelerometer to each individual tap (902) is known. A program with access to the data of two accelerometers can allow for increased accuracy in tap/gesture recognition. Having two data points listening can help differentiate gestures. One accelerometer may "hear" a gesture clearer in one situation and the other may "hear" it clearer in another situation. Clarity in vibration detection is essential in determining gestures. The bar environment can produce a lot of inadvertent sound vibrations, or "noise". Having two data points listening can help in noise reduction. Recognition of gestures has more functionality than just determining the difference between trying to communicate and inadvertent knocks. It also allows for a wide range of commands. A simple example, two knocks means the customer wants another drink, three knocks and a bump means he or she is ready to pay their bill. Another example, the bartender places coaster with drink specials on them. The exact location on the bar and the name of the drink special is stored in a data structure on the computer. The customer could knock twice on the coaster and the program would recognize where he or she knocked. The program would search the data structure for the drink based on the location, find it, and inform the bartender of the requested order. Two accelerometers collect vibration data and a central processing unit to manipulate the data. Each accelerometer is on an opposite end of the bar length wise as was seen in FIG. 9. Calculating the location of the tap/knock requires the distance between Accelerometer 1 and Accelerometer 2 and knowing the time delay between the "tap" vibrations reaching both accelerometers. When the vibration hits Accelerometer 1, its time of arrival $t_1$ is recorded. When the vibration hits the Accelerometer 2, its time of arrival $t_2$ is recorded. Each accelerometer is operating on a synchronized clock. Accelerometers wired directly to the processor will avoid network delays effecting the clock. Accelerometers wirelessly transmitting data to the processor will have to be embedded with clocks that are synchronized wirelessly before use. Subtracting the time of arrival of Accelerometer 2 by Accelerometer 1 gives $\Delta t$. The difference of distance between "tap" and the accelerometers ($\Delta D$) is found using the following equation: $\Delta D = \Delta t \times V_{table}$, where $V_{table}$ is the speed of sound through the table. The location of the "tap" with respect to Accelerometer 1 ($x_1$) can be found using the following equation:

$$x_1 = \frac{L + \Delta D}{2},$$

where L is the distance between the two accelerometers.

5.9.1 Example

A Bar

Figure 10:
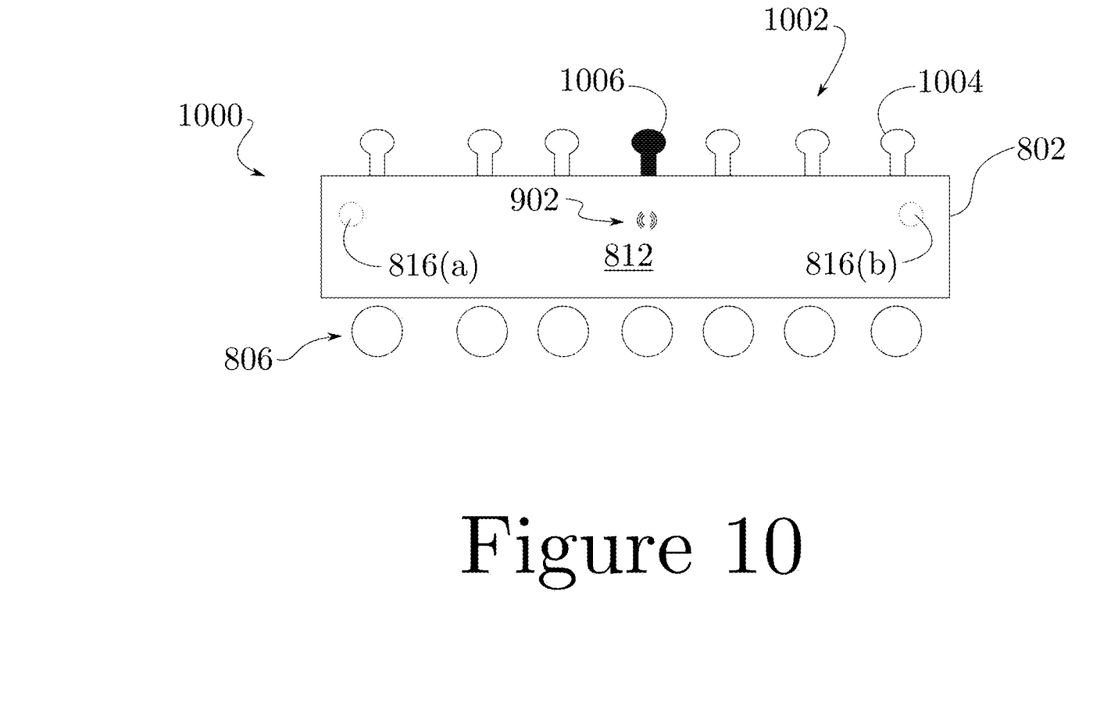
FIG. 10 is an example of a linear touch screen implemented into a bar with a light display in accordance with the present invention.

FIG. 10 illustrates one example of a bar (1000) in accordance with the present invention. With further reference to FIGS. 8 and 9, the required materials consist of three elements: two accelerometers, and one central processing unit ("CPU", not shown). These elements could be represented in a number of ways. For example, the bartender or bar owner could provide a smart phone device to act as one of the accelerometers and the CPU. The other accelerometer could then be a second smartphone, or a custom designed component, that translates data through wired, or wireless, communication to the CPU for analysis. The smartphones would be secured into place to prevent it from being bumped around. The better the phones are secured, the less likely of receiving poor results. The smart phone would then utilize an application to input, store, and calculate the data and present the bartender with notifications when applicable. This scenario is a temporary and portable solution. Another example could require installation of hardware into the bar. For example, the two accelerometers could be embedded into each end of the bar length wise. Both accelerometers would be wired to a CPU. The CPU would be a computer easily accessible by the bartender. The CPU would analyze the data using the math algorithm describe above and display notifications of drink requests on a display. Providing the information to the bartender could use similar techniques as described previously in "server notification". An example of a message notification on a hand-held device might read, Seat 5 is requesting a refill." In another example for displaying notifications, the bar can include a series of lights (1002), one proximate each customer location. Inactive locations would be indicated by a lack of illumination (e.g., 1004). Tapping on the bar (902) causes illumination of a light (1006) in proximity to the customer. The light could be located on the ground, on the bar, or above the customer. The light would indicate a requested service. Different color lights or light intensities may allow for differentiation of requested topics. See FIG. 11 for an example of a light display implemented in a bar setting.

5.9.2 Example

An Interactive Table-Touch Menu

In one aspect, the present invention provides a table (referred to herein as a "Touch Table"), capable of responding to taps or other like vibrations made at specific locations on the table top, thus acting like a touch screen but without the visual limitations. In one embodiment, three or more accelerometers, a processor, and a wireless signaling device, are used as described herein to determine the location of a user's tap anywhere on the table surface. In some embodiments the type of tap is also determined. In a more specific embodiment, the table has images or instructions (or both) for ordering menu items or requesting services from an employee. The detected tapped signals are then relayed to staff by wireless or wired transmission directly for decoding or decoded at the site and then transmitted.

Figure 11:
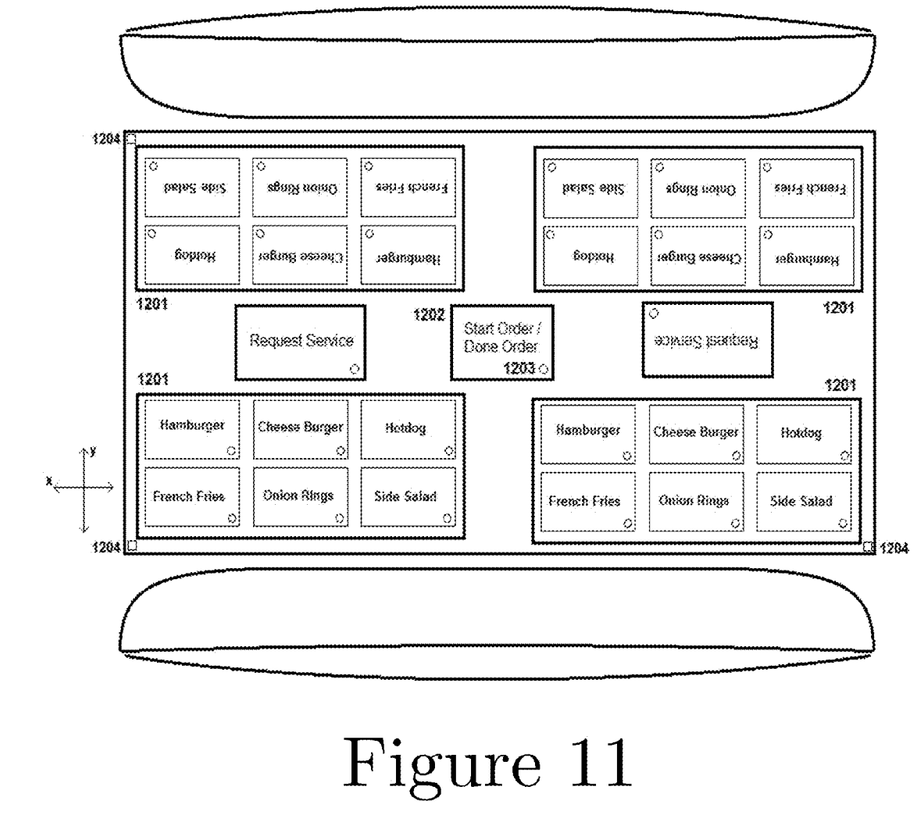
FIG. 11 is an example of a linear touch screen implemented as a table-touch menu in accordance with the present invention.

FIG. 11 illustrates one non-limiting, illustrative exemplary embodiment of a table-touch menu for a restaurant. The table has four menus (1201), one facing each possible seat. Each menu consists of Touch Areas (1202) representing items on the menu. These Touch Areas are accompanied by LED lights that illuminate to confirm taps. The "Start Order/Done Order" Touch Area (1202) must be double tapped before customers begin to order. Once double tapped, A LED (1203), alongside the "Start Order/Done Order" Touch Area, is illuminated to confirm that the Touch Table is ready to receive orders. Once the system is ready, each customer takes a turn ordering their food, double tapping on items they would like. Double tapping on an item illuminates the LED and tells the processor what the customer ordered. Double tapping an item again will remove it from the order. The processor locates which Touch Area on the table correspond to which item on the menu as described herein. The Touch Areas are based on a graph originating at one of the accelerometers. The physical displays of menu items and commands have no electronic connection to the processor; they just supply the customer with a visual cue of where to tap. These taps are located using the three accelerometers embedded into the table (1204). The lights stay illuminated throughout the ordering process, allowing the customer to review their order before submission. Once the order is complete, the customer double taps "Start Order/Done Order" again to send the order to the kitchen. At any time an item can be added to an order by double tapping the "Start Order/Done Order" Touch area and starting the process over. These items will be added to the same tab until the customer pays the check. Once the order is completed, two receipts are printed out: one for the chief and one for the food runner. In this embodiment, the Touch Table will be appreciated to improve efficiency. Implementation of such a device will be understood by those having ordinary skill in the art.

FIG. 11 shows an non-limiting, illustrative exemplary layout of a Touch Table in accordance with the present invention. The table can include more or less detail, depending on the desired results. The former could include a detailed menu with dozens of options and specific service requests. The ladder could include something as simple as a "Ready to Order" Touch area and a "Refill Drinks" Touch area. These are just two more examples or how the Touch Table could be implemented. Implementation of such a device will be understood by those having ordinary skill in the art.

In one embodiment, the table uses its three accelerometers to create a coordinate grid. The accelerometers detect the taps and the processor triangulates where it occurred on the graph. The processor can do this by using the speed the vibrations travel through the table and the time of arrival to each accelerometer. This triangulation of a tap will return an ordered pair of coordinates (x, y). The coordinates are compared to the defined coordinates of Touch Areas on the table. In some embodiments, the Touch Areas coordinates are ranges defining an area, such as a rectangular two-dimensional box, not specific values. For example, the area "Start Order/Done Order" in FIG. 11. Any recognized taps that occur in this range will start (or stop) the ordering process. After the order process is done, the processor sends the order to the kitchen. This can be done through Bluetooth, Wi-Fi, RFID, etc. The kitchen has a receiver to capture the wireless signal, and a printer to print the order slips.

5.9.3 Example

An Armrest

In another embodiment, an accelerometer, processor, and Bluetooth chip are embedded into the arm rest of an airplane seat for signaling a flight attendant. Traditionally in order to request service of a flight attendant a passenger would have to reach for the ceiling and press the "flight attendant" button. This current implementation causes two problems; extra trips to the passenger for the flight attendant, and disturbing other passengers by reaching for the single button shared by three passengers. When a passenger pushes the flight attendant button the flight attendant has no idea why the passenger is requesting service. Thus the flight attendant must go visit the passenger, walking through a narrow and crowded isle, and ask. If the passenger is requesting a blanket the flight attendant now has to make a trip to get one and a trip to bring it to the passenger. With the invention the passenger could rhythmically tap their armrest three times. The accelerometer would share the data with the processor, the processor would recognize the coordinated vibration signatures generated by the tap, the Bluetooth chip would send a message to the flight attendant located at one end of the plane, and the message would read "Blanket for row 'x' seat 'y'." The passenger has now also avoided disturbing the passengers around them by reaching for a central button. Other tap gestures could signal different request to the flight attendant. Three taps meaning the passenger would like a blanket, two taps followed by two taps meaning the passenger would like water, four taps meaning the passenger would like to order a snack or drink, and five or more rapid taps meaning a medical emergency.

Such embodiments can be retrofitted into the armrest of airplanes without significant remodeling of current airplanes. Similar to dinnerware retrofitting described above, a tab impregnated with the required accelerometer processor and Bluetooth chip could be fastened to the bottom of each arm rest. As most taps would occur toward the end of the armrest where one usually rests their hand, the invention system could be fastened more toward the end. This would allow for a good reading of the gestures. The system could be powered by the system that powers the headphone jacks found on most airplanes. Tapping into that power would prevent the need for rechargeable or inductive charging systems.

5.9.4 Example

Shelving and Counters

In other aspects, the devices of the invention are implemented into shelves and counters in a retail store setting. It would be very usable in a superstore situation where a customer may have a hard time locating or feeling comfortable approaching an employee to assist them. Every isle in a retail store, such as Walmart, target, BestBuy, etc., would be fitted with accelerometers dispersed across the shelves. Each accelerometer would be in direct communication with a processor, one processor per isle or per defined product area. The accelerometers would take in vibration input from a customer, which the customer generates by tapping the shelves, and feed the input to the processor. The processor can use tap recognition software to determine if the tap was a recognizable gesture and if so alert an employee of the situation. It alerts the employee by notifying a hand-held device, illuminating a light displayed in the employee's in line of sight, or sounding an alert noise. All three of these alerts all commanded by a Bluetooth signal received from the processor. The system would have to be powered directly powered by a wall power source or tapped into a local power source that may already be implemented into a shelf.

6 CONCLUSION

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A serving item configured to transmit a status of a user of such serving item, comprising:
a serving item operably coupled to an accelerometer,
a transmitter,
a power source, and
a computer processor,
said accelerometer, transmitter, power source, and computer processor being further operably coupled such that changes in the physical state of said serving item indicative of a change in the status of said user of said serving item are detected by the computer processor by analyzing signals from the accelerometer and the changes in status are transmitted from said serving item to a restaurant staff computing device, wherein the status indicates to the restaurant staff computing device that the user requires service, and
wherein said serving item is a plate or a drinking glass or flatware or silverware.

2. The serving item of claim 1, wherein said serving item is responsive to at least one vibrational signature.

3. The serving item of claim 1, wherein said accelerometer, transmitter, power source, and computer processor are integral with said serving item.

4. The serving item of claim 1, wherein said accelerometer, transmitter, power source, and computer processor are coupled externally with said serving item.

5. The serving item of claim 1, wherein said accelerometer transmitter, power source, and computer processor are arranged in a disk dimensioned to securely fit to the underside of said plate or drinking glass.

6. The serving item of claim 5, wherein said disk is an elastomeric material dimensioned to accept a portion of the lower edge of said plate or drinking glass, and said fit is create substantially by a friction fit between said disk and said lower edge of said glass.

7. The serving time of claim 5, wherein said disk is attached directly to the underside of said plate or drinking glass.

\* \* \* \* \*